April 18, 1967 R. J. ROWEKAMP 3,314,415
STRUCTURAL MODIFICATIONS TO A POOL-TYPE SOLAR COLLECTOR
Filed May 1, 1964 2 Sheets-Sheet 1

INVENTOR

RICHARD J. ROWEKAMP

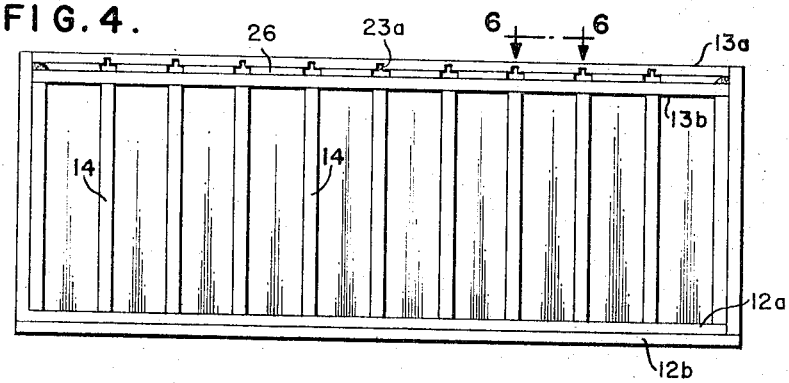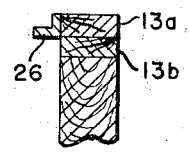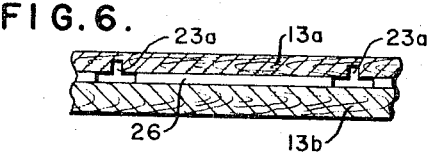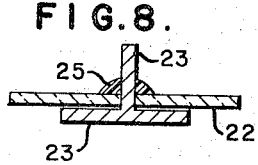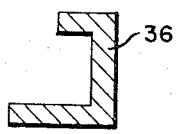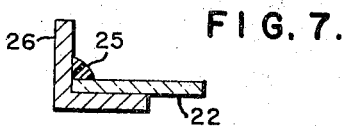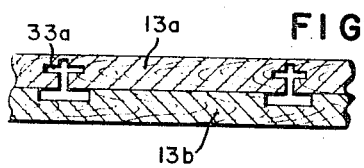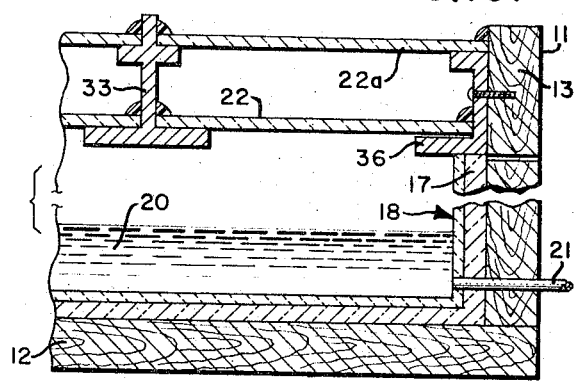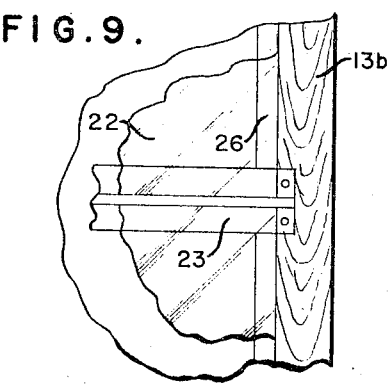

United States Patent Office 3,314,415
Patented Apr. 18, 1967

3,314,415
STRUCTURAL MODIFICATIONS TO A POOL-
TYPE SOLAR COLLECTOR
Richard J. Rowekamp, 3626 Glenmore Ave.,
Cincinnati, Ohio 45211
Filed May 1, 1964, Ser. No. 364,237
5 Claims. (Cl. 126—271)

The purpose of this invention is to adapt the pool-type solar heat and energy collector, described in application Serial Number 289,988, now Patent No. 3,161,193, and 311,288 filed September 23, 1963, to the varying weather conditions and site requirements which exist throughout the world. Since the aforementioned pool-type collectors are constructed of lightweight insulating concrete, it is quite possible that, in certain regions of the world and under certain conditions, this type of construction will be unsatisfactory and impractical. For example: some regions of the earth receive very abundant rainfall; and if the collector were not completely waterproof, it could become water-soaked, and lose its insulating effect; in addition, in cold regions of the world, where the ground heaves during the winter as a result of freezing, the lightweight insulating concrete probably would break apart, as it has little structural strength. Also, the flat roof of industrial and commercial buildings might sag and break down if too many collectors were placed on them, because, although, lightweight insulating concrete is used, the cement itself is very heavy. Therefore, several structural modifications are necessary if pool-type solar collectors are to meet all the climatic and architectural conditions found around the world.

An object of this invention, therefore, is to design a concrete pool-type solar collector which will be especially suitable for wet or cold regions of the world, and a wood-frame collector which will be lighter than concrete, and which will be especially suitable for use on the flat roof of an industrial or commercial building.

Of course, the prime object of this invention is to provide a pool adapted to hold water beneath a transparent panel which faces toward the sun so that the heat energy from the sun can be accumulated to heat the water.

Another object of this invention is to provide a variety of aluminum T-bars and angle bars which can be anchored to the wood-frame collector so that either single-glazing or double-glazing of the pool is possible.

The above and other objects and features of the invention will be apparent to those skilled in the art to which this invention pertains from the following detailed description and drawings, in which:

FIG. 4 is an enlarged view in front elevation taken on line 4—4 in FIG. 3.

FIG. 5 is an enlarged view in side elevation taken on line 4—4 in FIG. 3.

FIG. 6 is a fragmentary enlarged view in front elevation taken on line 6—6 in FIG. 4.

FIG. 7 is an enlarged view in section of the aluminum angle bar shown in FIG. 5, together with the transparent panel which it supports.

FIG. 8 is a view in section taken on the line 8—8 in FIG. 2.

FIG. 9 is a fragmentary enlarged plan view showing the mounting of an end portion of one of the mullions together with associated portion of the device.

FIG. 10 is a fragmentary enlarged view in front elevation of a double glazed wood-frame pool-type solar collector constructed in accordance with an embodiment of this invention.

FIG. 11 is a view in section of the aluminum angle bar shown in FIG. 10, which provides a means of double glazing the pool-type solar collector.

FIG. 12 is a fragmentary enlarged view in front elevation taken on line 6—6 in FIG. 4 as it would apply to the double glazed pool shown in FIG. 10.

In the following detailed description and the drawings, like reference characters indicate like parts.

Figure 1:
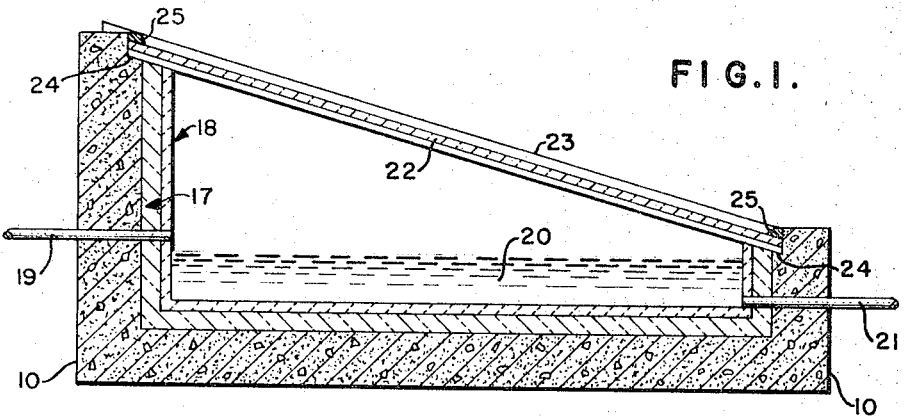
FIG. 1 is an enlarged view in section showing a concrete pool-type solar collector constructed in accordance with an embodiment of this invention.

In FIG. 1 is shown a pool 10 which is formed of air-entrained concrete that is made from a mixture of Portland cement, varsol resin, sand, gravel, and water; it has front and rear walls, end walls, and a base as described in application Serial No. 289,988, now Patent No. 3,161,193. The entire interior of pool 10 is insulated with insulating material 17, which can be sheets of polyurethane resin, or asphalt impregnated structural fiberglass, or prefabricated reinforced slabs of lightweight insulating concrete. The insulating material can be bonded or fastened to the concrete pool 10 through any conventional means such as a cement or asphalt paste or by screws. The pool 10 is made water-tight by installing a black interior surface 18 over the top of the insulating material 17, which can be accomplished in any of the following ways: if sheets of polyurethane resin or structural fiberglass are used, they can be covered with large sheets of black porcelain enamel or black aluminum fitted tightly over the insulating material and welded together to form the water-tight interior surface 18; if reinforced slabs of lightweight insulating concrete are used, they would be covered with a coating of grey-iron castings, cement, and coal dust as described in application Serial No. 289,988, now Patent No. 3,161,193. The "black" aluminum can be obtained merely by using aluminum sheetmetal containing silicones or manganese, and it will turn black during use through oxidation when in contact with sunlight and water. Any one of the above-mentioned insulating materials or interior surface materials will provide satisfactory insulation and make the pool water-tight. An inlet line 19 permits entry of water 20 into the interior of pool 10, and a discharge line 21 permits removal of heated water therefrom. The pool 10 is mounted with sheets of glass 22 which slope downwardly toward the south if in the Northern Hemisphere (toward the north if in the Southern Hemisphere) so that the heat from the sun can be accumulated in the water 20 held in the pool. The glass sheets 22 are supported both by inverted T-mullions 23 and by shoulders 24 which are formed into the upper inner portion of the concrete walls. The glass panes are held in place by glazing compound 25 such as polysulphide resin polymer or the like. More complete details concerning the inverted T-mullions and the construction of the concrete pool are given in application Serial No. 289,988, now Patent No. 3,161,193, and are not repeated here.

It is the intention of this invention that the concrete pool-type solar collector described herein could be double glazed in the same fashion as described in FIG. 7 of the drawings and in the specifications for application Serial No. 311,288 filed September 23, 1963.

Figure 2:
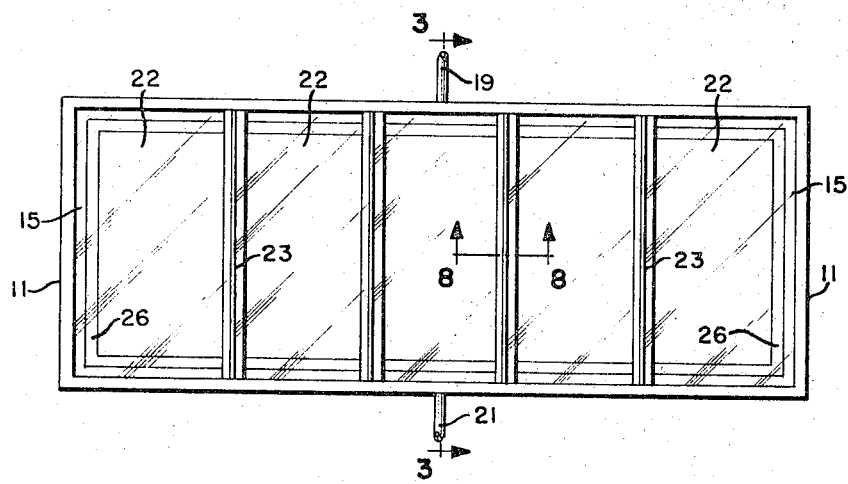
FIG. 2 is a schematic plan view showing a wood-frame pool for accumulating solar heat and energy constructed with an embodiment of this invention.
Figure 3:
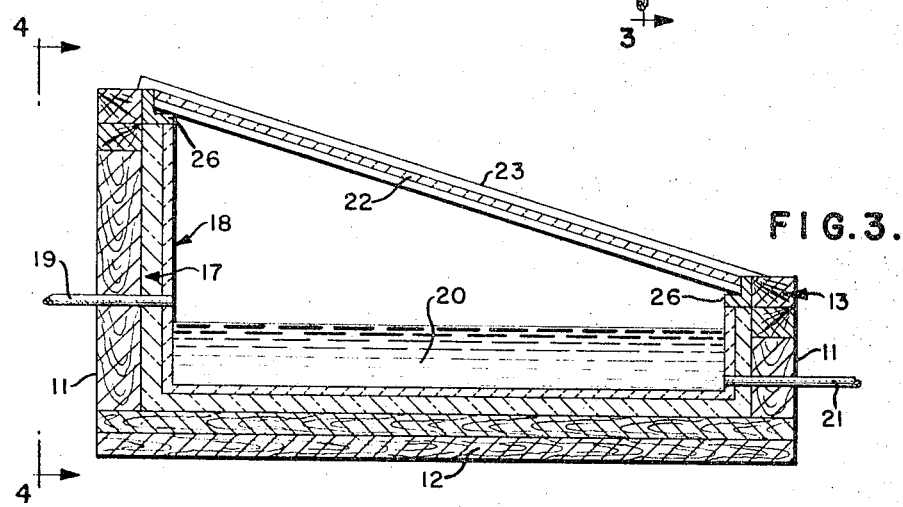
FIG. 3 is an enlarged view in section taken on line 3—3 in FIG. 2.

In FIGS. 2, 3, and 4 is shown a wood-frame pool 11 and the details of its construction. The wood-frame consists of a bottom-plate 12, a top-plate 13 (FIG. 3), and studs 14 (FIG. 4), which form the front and rear walls, the end walls, and base of the pool. 2″ x 4″ fir or redwood lumber, treated with creosote preserving material, or any other kind of construction lumber or preserving material, can be used to make the wood-frame 11. Either nails or screws can be used to fasten the lumber together. To provide support for insulating material 17, the interior walls and base of the wood-frame pool 11 can be lined with redwood sheathing 15 (shown only in FIG. 2). The sheathing 15 need not be absolutely used, however, (and, therefore, it has been omitted in FIG. 3 and FIG. 10). The insulating material 17 can be sheets of polyurethane resin, asphalt impregnated structural fiberglass, or prefabricated reinforced slabs of lightweight insulating concrete. The wood-frame pool 11 is made water-tight by installing a black interior surface 18 over the top of insulating material 17 in exactly the same manner as described for the concrete pool 10. An inlet line 19 permits entry of water 20 into the interior of pool 11, and a discharge line 21 permits removal of heated water therefrom. The upper portion of pool 11 is covered with glass panes 22 which are supported by inverted T-mullions 23 and by aluminum angle bars 26. Aluminum angle bars 26 are nailed or screwed to the inner portion of top-plate 13, and correspond to the shoulder 24 used in concrete pool 10; they are fastened completely around the upper-inner portion of the front, rear, and end walls of the pool 11, and line up with the inverted T-mullions 23 so that the glass panes 22 will lay evenly upon them.

FIGS. 4 through 9 describe a novel way of mounting the glass panes 22 on the upper-inner portion of the pool 11. In FIG. 4 is shown how the wood-frame pool 11 is constructed: the bottom-plate 12 is comprised of upper-number 12a and lower-member 12b; the top-plate 13 is comprised of upper-member 13a and lower-member 13b; the studs 14 are spaced from 12" to 24" on center, and are nailed or screwed to the bottom-plate and top-plate to form the wood-frame pool 11. The studs 14, which form the base of the pool 11 are now shown in any of the drawings, and they would lay upon the flat roof of an industrial building, and would be nailed or screwed into the bottom-plate 12. On the lower portion of top-plate 13a are provided grooves or slots 23a, into which fit inverted T-mullion 23. Inverted T-mullion 23 rests upon the lower-member 13b of top-plate 13, and is fastened to it by means of screws (FIG. 9); the mullion 23 protrudes into slots 23a, which can be made by an electrical tool called a router which is made especially to cut out grooves or slots in wood. Aluminum angle bars 26 are also fastened to top-plate 13a by means of screws, and the flanged portion of each line-up with one another so that the glass will rest evenly upon them.

FIG. 5 shows aluminum angle bar 26 fastened to upper-member 13a of top-plate 13. FIG. 6 shows the grooves o rslots 23a which are cut into top-plate 13a, so that inverted T-mullion 23 will fit into it. FIG. 7 shows aluminum angle bar 26 supporting a glass pane 22; the glass pane is held in place by glazing compound 25. FIG. 8 shows inverted T-mullion 23 supporting adjacent edges of panes of glass 22, which are held in place by glazing compound 25. As shown in FIG. 9, the flanged portion of invetred T-mullion 23, rest upon lower-member 13b of top-plate 13, are fastened thereto by screws. Aluminum angle bars 26 are also fastened to the lower-member 13b of top-plate 13, and the extended portion of it joins with the flanged portion of inverted T-mullion 23 to provide a continuous support for panes of glass 22.

FIGS. 10, 11, and 12 describe a novel way of double glazing wood-frame pool 11. As shown in FIG. 10, wood-frame pool 11 is constructed exactly as the single glazed pool, except that it has an inverted double-T-mullion 33 and a double-angle or U bar 36 (one leg shorter than the other), which provide support for glass covers 22 and 22a. FIG. 11 shows aluminum double angle U bar 36 (with one leg shorter than the other, which allows pane of glass 22 to be slipped into place). As shown in FIG. 12, grooves or slots 33a are cut into upper-member 13a and lower-member 13b of top-plate 13 so that inverted double-T-mullion 33 can slide into them, and thus be anchored to lower-member 13b as shown in FIG. 9.

The pool-type solar heat and energy accumulating device illustrated in the drawings and described above, is subject to structural modifications without departing from the spirit and scope of the appended claims.

Having described my invention, what I claim as new and desire to secure by Letters Patent, is:

1. A heat accumulator for collecting solar energy in a liquid, which comprises a pool having a base and walls extending upwardly from said base, transparent sheet means spanning the walls, said base and walls being formed of air entrained concrete, insulating material lining the interior walls and base of said pool, a black interior surface covering said insulating material, said black interior surface comprising a sheet of aluminum containing silicones and manganese which will turn black through oxidation when in contact with sunlight and water, means for introducing a liquid into the pool to be heated by the sun, and means for removing heated liquid from the pool.

2. A heat accumulator for collecting solar energy in water, which comprises a pool having a base and front, rear, and side walls extending upwardly from said base, said base and walls being made from air entrained concrete, insulating material lining the interior walls and base of said pool, a black interior surface covering said insulating material, said black interior surface comprising a sheet of aluminum containing silicones and manganese which will turn black through oxidation when in contact with sunlight and water, a series of glass panes mounted on the upper portion of the pool, said series of glass panes being supported by shoulders on the inner portion of the front, rear, and side walls of the pool and by inverted T-mullions anchored in the uppermost part of the front and rear walls; said walls having a front side of lesser height than the rear, and side walls which slant to face toward the sun; filling means which consists of a pipe which allows cool water to said pool, and emptying means which consists of a pipe which allows water heated by sunlight to drain from said pool.

3. A heat accumulator for collecting solar energy in water, which comprises a pool having a base and walls extending upwardly from said base, said base and walls being constructed of a wood frame, wood sheathing fastened to the interior walls and base of said wood frame, said wood frame and sheathing comprised of construction lumber that is treated with creosote preserving material, insulating material fastened to said wood sheathing, a black interior surface covering said insulating material, said black interior surface comprising a sheet of aluminum containing silicones and manganese which will turn black through oxidation when in contact with sunlight and water, a series of glass panes mounted on the upper portion of the pool, means for filling the pool with water, and means for removing heated water from the pool.

4. A heat accumulator for collecting solar energy in water, which comprises a pool having a base and front, rear, and side walls extending upwardly from said base, said base and walls being constructed of a wood frame, wood sheathing fastened to the interior walls and base of said wood frame, said wood frame and sheathing being comprised of redwood lumber that is treated with a preserving material, insulating material fastened to said wood sheating, a black interior surface covering said insulating material, said black interior surface comprising a sheet of aluminum containing silicones and manganese which will turn black through oxidation when in contact with sunlight and water, a series of glass panes mounted on the upper portion of the pool, means for filling the pool with water, and means for removing heated water from the pool; said wood frame being comprised of wood studs which are nailed to a wood bottom-plate and a wood top-plate and forming the front, rear, side walls, and base of said pool; said bottom-plate being comprised of an upper-member and a lower-member, and said top-plate being comprised of an upper-member and a lower-member; said glass panes being supported by inverted T-mullions and angle bars, said angle bars being fastened to the upper-member of the top-plate, said inverted T-mullion being fastened to the lower-member of the top-plate, said upper-member of the top-plate containing grooves into which fit the flanged and vertical portions of the inverted T-mullions; the flanges of the inverted T-mullions and the angle bars being properly aligned so that the glass panes will rest evenly upon them.

5. A heat accumulator for collecting solar energy in a liquid, which comprises a double-glazed pool having a base and walls extending upwardly from said base, said base and walls being constructed of a wood frame, insulating material lining the interior of said wood frame, a black interior surface covering said insulating material, said black interior surface being sheet metal that is baked to a black porcelain enamel finish, said double glazing being accomplished through the use of an inverted double-T-mullion and double angle bars, said double angle bars being U-shaped, with one leg shorter than the other, means for introducing a liquid into the pool to be heated by the sun, and means for removing heated lquid from the pool.

References Cited by the Examiner

UNITED STATES PATENTS

| | | |
|---|---|---|
| 2,383,234 | 8/1945 | Barnes. |
| 2,917,817 | 12/1959 | Tabor. |
| 3,104,210 | 9/1963 | Mount _____ 126—271 X |
| 3,161,193 | 12/1964 | Rowekamp _____ 126—271 |

CHARLES J. MYHRE, *Primary Examiner.*